United States Patent
Luterotti et al.

(10) Patent No.: US 7,985,953 B2
(45) Date of Patent: Jul. 26, 2011

(54) SYSTEM AND METHOD OF DETECTING HUMAN PRESENCE

(75) Inventors: Lorenzo Luterotti, Go (IT); Dragan P. Petrovic, Geneva, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/059,179

(22) Filed: Mar. 31, 2008

(65) Prior Publication Data
US 2009/0242769 A1 Oct. 1, 2009

(51) Int. Cl.
*G01J 5/02* (2006.01)
(52) U.S. Cl. ............... 250/339.02; 250/353; 250/336.1
(58) Field of Classification Search ............ 250/339.02, 250/353, 336.1
See application file for complete search history.

(56) References Cited

U.S. PATENT DOCUMENTS

| | | | | |
|---|---|---|---|---|
| 3,789,384 A * | 1/1974 | Akers | | 340/521 |
| 3,958,118 A * | 5/1976 | Schwarz | | 250/221 |
| 4,319,229 A * | 3/1982 | Kirkor | | 340/521 |
| 4,375,034 A * | 2/1983 | Guscott | | 250/342 |
| 4,912,748 A * | 3/1990 | Horii et al. | | 250/221 |
| 5,693,943 A * | 12/1997 | Tchernihovski et al. | | 250/342 |
| 5,703,368 A * | 12/1997 | Tomooka et al. | | 250/349 |
| 5,844,240 A * | 12/1998 | Lee et al. | | 250/342 |
| 6,163,025 A * | 12/2000 | Pantus | | 250/338.3 |
| 6,211,522 B1 * | 4/2001 | Kotlicki et al. | | 250/353 |
| 6,215,399 B1 * | 4/2001 | Shpater | | 340/567 |
| 6,239,437 B1 * | 5/2001 | Barone | | 250/353 |
| 6,324,008 B1 * | 11/2001 | Baldwin et al. | | 359/619 |
| 6,818,881 B1 * | 11/2004 | Chernichovski et al. | | 250/216 |
| 7,053,374 B2 * | 5/2006 | Barone | | 250/353 |
| 7,115,871 B1 * | 10/2006 | Tracy et al. | | 250/349 |
| 7,504,633 B2 * | 3/2009 | Zhevelev et al. | | 250/353 |
| 2001/0045520 A1 * | 11/2001 | Asano et al. | | 250/342 |
| 2006/0180764 A1 * | 8/2006 | Yajima et al. | | 250/349 |
| 2006/0192670 A1 * | 8/2006 | Tice | | 340/522 |
| 2007/0023662 A1 * | 2/2007 | Brady et al. | | 250/338.3 |
| 2008/0297360 A1 * | 12/2008 | Knox et al. | | 340/628 |

FOREIGN PATENT DOCUMENTS

| | | |
|---|---|---|
| EP | 93103756.8 | 10/1993 |
| EP | 0 716 402 A1 | 6/1996 |
| EP | 1 154 387 A2 | 11/2001 |
| JP | 2002-039334 | 8/2003 |

* cited by examiner

*Primary Examiner* — David P Porta
*Assistant Examiner* — Djura Malevic
(74) *Attorney, Agent, or Firm* — Husch Blackwell

(57) ABSTRACT

A detector of human emitted Blackbody radiation includes a plurality of series connected thermocouples. A lens can be associated with each of the thermocouples. Incoming radiation produces a different response in each of the thermocouples in accordance with a respective angle of arrival even from a motionless radiation source.

11 Claims, 4 Drawing Sheets

SYSTEM AND METHOD OF DETECTING HUMAN PRESENCE

FIELD

The invention pertains to detectors which can be used alone or in monitoring systems to sense the presence of humans in a predetermined region. More particularly, the invention pertains to such detectors which make use of multiple thermocouples.

BACKGROUND

Various types of monitoring systems can effectively use detectors which indicate the presence of human beings in a predetermined region. These include, intrusion monitoring systems, HVAC systems, ambient condition monitoring systems such as fire or gas detecting systems, and limited mobility/elder persons assistance systems.

Fire detection systems usually include a plurality of devices including sensing devices, initiating modules and sounders connected to a main control panel. In case of danger/fire the control panel, according to it's settings, can initiate an evacuation procedure using audio and visual devices, call fire departments and, in case of sensitive areas, initiate operation of automatic extinguishment systems for example, $CO_2$ gas release systems.

In many applications such as hotel rooms, hospitals or elderly residences, human presence tracking and localization is useful to reduce time to evacuation. Moreover when automatic extinguisher systems are in place such systems would be a means to reduce risk of asphyxiation/intoxication if extinguisher gases are released whilst persons are present.

In order to detect that a person is present in an indoor environment, numerous technical solutions based on a large variety of physical phenomena are available. Apart from the widespread use of passive infrared (PIR) detectors, which usually require motion to detect a person, low frequency/pressure responsive acoustic sensors, active systems using infrared light, ultrasound or microwaves can also be used. Also video cameras are widely applied in security systems.

Various access control systems including electronic keys (transponders, touch memory and systems for biometrical identification (fingerprint recognition, handwriting recognition, etc.) are also available.

Emitted radiant energy offers a basis to sense human presence. All objects are composed of continually vibrating atoms, with higher energy atoms vibrating more frequently. The vibration of all charged particles, including these atoms, generates electromagnetic waves. The higher the temperature of an object, the faster the vibration, and thus the higher the frequency of spectral radiant energy. As a result, all objects are continually emitting radiation at a rate with a wavelength distribution that depends upon the temperature of the object and its spectral emissivity.

Radiant emission is usually treated in terms of the concept of a blackbody. A blackbody is an object that absorbs all incident radiation and, conversely according to the Kirchhoff's law, is a perfect radiator. The energy emitted by a blackbody is the maximum theoretically possible for a given temperature. The radiative power (or number of photon emitted) and its wavelength distribution are given by the Planck radiation law:

$$W(\lambda, T) = \frac{2\pi hc^2}{\lambda^5}\left[\exp\left(\frac{hc}{\lambda kT}\right) - 1\right]^{-1} \quad W/(cm^2 \mu m),$$

where $\lambda$ is the wavelength, T is the temperature, h is the Planck's constant, c is the velocity of light, and k is the Boltzmann's constant.

Human bodies are very good IR sources. The temperature of a typical human body is about 37° C. or 98° F. There is a constant heat exchange between the body and the environment due to the difference in their temperatures. The radiation characteristics of any object can be analyzed using the blackbody radiation curve governed by Planck's law.

For a typical human body, this curve is shown in FIG. 1. In FIG. 1, essentially all of the radiation is in the IR region with the peak radiation occurring at about 9.4 µm. The amount of power that the human body radiates within the wavelength range of interest is determined by integrating the blackbody radiation curve, FIG. 1, over this range.

There is a continuing need to be able to sense the presence of humans in regions of interest particularly in the presence of dangerous, or alarm conditions. In some environments, location, in addition to just presence detection, is important. Preferably detectors usable for sensing presence and/or location of individuals could be incorporated into regional monitoring, or alarm systems such as fire or gas detection systems, to provide another source of information to system operators as well as to first responders.

DETAILED DESCRIPTION

Figure 1:
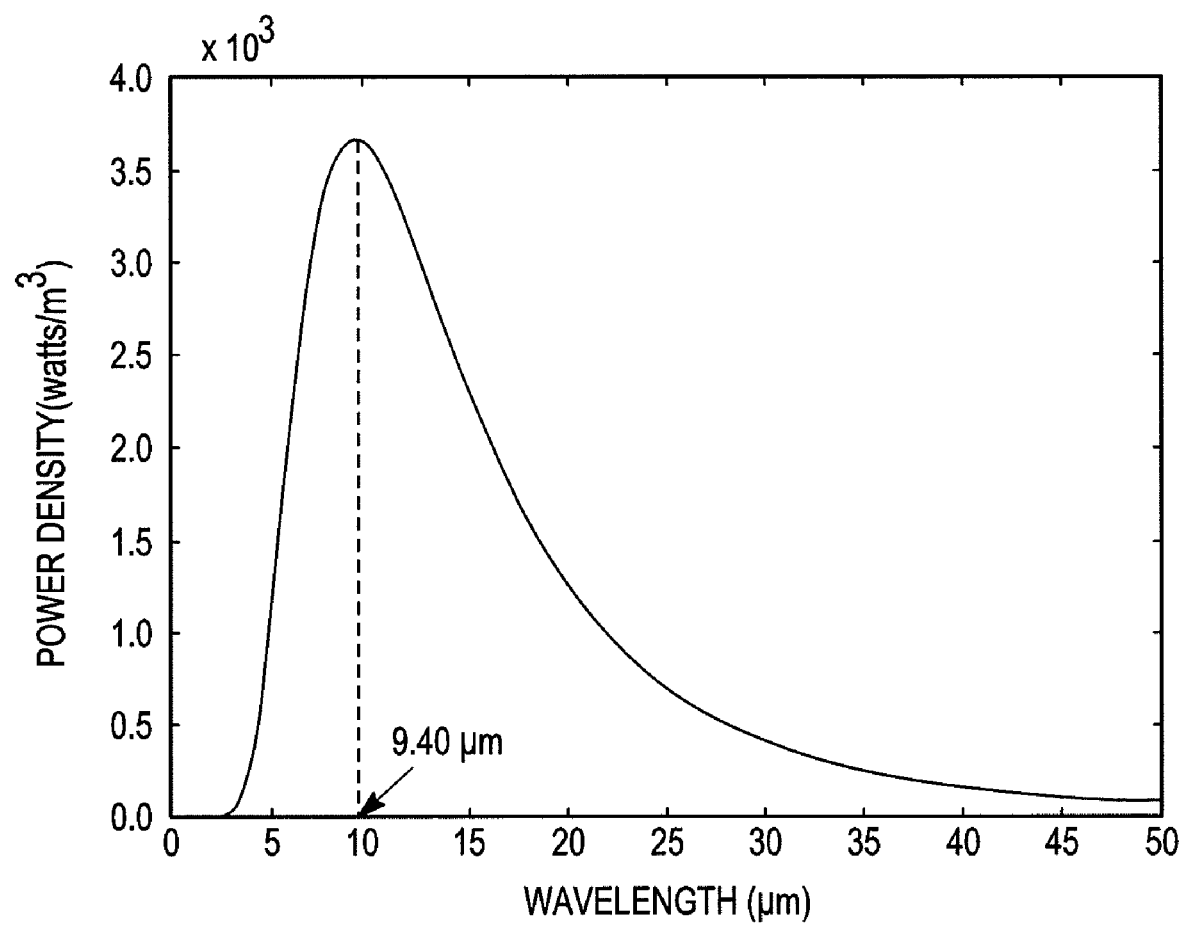
FIG. 1 is a graph illustrating human emitted Blackbody radiation.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

For localization of humans (even still humans) exploiting their natural emission of IR radiation thermopiles can be used. These devices are thermoelectric sensors based on the Seebeck effect. They are formed of a plurality of thermocouples electrically connected in series in order to increase the output voltage.

A thermocouple is usually formed by a dissimilar metal junction. Hence, the series of thermocouples results in a chain of junctions between two metals a and b. All junctions a ! b—usually referred to as hot junctions—are thermally coupled with the absorber membrane. The junctions b ! a (cold junctions) are coupled to the device frame, which is a large integrated or external heat sink.

The amount of infrared radiation received by the membrane is proportional to the electrical potential obtained. Accordingly, the resulting voltage of the thermopile is proportional to the temperature difference of the hot and cold junctions, i.e. the membrane and the heat sink. For absolute temperature measurement, a reference sensor (typically a thermistor) can be incorporated into the circuitry. If the heat sink is sufficiently large, these devices can be operated without any added cooling.

Integrated thermopiles have become commercially available and are relatively inexpensive (although they are still significantly more expensive than standard photodiodes). They are widely used in non-contact temperature measurement in medical, automation and control applications. Integrated thermopiles are available on the market as single element devices and arrays (e.g., 1×8 line arrays or 4×4 matrix array such as circuit No. TPLM 086 from Perkin Elmer).

Embodiments of the invention, include integration of a human responsive sensor/module in a fire detector, into a sounder or as a dedicated module connected on main fire system loop. A detector in accordance with the invention could be installed in the area/room to be supervised to have a direct view of the area being supervised. In another aspect, a thermopile might be used as an additional flame/hot spot detector to enforce/confirm the existence of an alarm condition using multiple criteria alarm or condition sensors. When a thermopile is used as an additional fire alarm input a photodiode could be used to further distinguish human presence from fire presence. Photodiode silicon spectral sensitivity respond to flaming fires but do not respond to human presence so the thermopile/photodiode pair would act as an effective fire/human presence discrimination method.

Another feature of the system is that tracking human presence might be used as an additional criteria for reducing false alarms of the system. For example, it has been statistically established that most of false alarms are related to human presence, for example due to human generated smoke, dust, paint etc.

Another embodiment could incorporate a system for elderly assistance. In this embodiment, several modules might be used for triangulation to establish location rather then simple presence detection.

In yet another aspect, typical position vs. time profiles in a determined space for example, bed during nights and sofa/table during days, could be established and stored. If an elderly person falls and is not able to stand up again that individual's position could be determined and an alarm issued.

A remote assistance center might call the person to check if assistance is needed. This system might be enhanced by wearable RF "stand up" sensor to be combined with position sensing. The two systems mutually improve detection ability and reduce false alarm rates. Such detectors could also be incorporated into intrusion or burglar alarm systems.

In yet another aspect of the invention, one method for detecting the presence of, and locating with rough approximation, a human body within a field of field of view (FOV) of a radiation sensitive device is based on different incident radiation angles of arrival (AOA) at a single sensor in a thermopile array. For example, four element arrays could be used. Lenses can split the space into different areas and alter the intrinsic spatial sensitivity diagram of each thermopile accordingly. The detectors' response is different according to different spatial/angular sensitivity.

Such detectors operate in the 5- to 14-µm region; using typical values for the area of the human body, the power emitted from the body is estimated to be about 100 W in this wavelength range. This power is radiated isotropically. The amount of power available at a detector at a certain distance from the source depends on the distance as well as the area of the detector elements. IR detectors that are sensitive in the 10-µm range would thus be able to detect humans at a fairly reasonable range.

The AOA on the thermopile array can be projected by processing the different sensors' spatial responses to the same stimulus thus thereby obtaining information about the presence and the relative position of person within approximately 5 meters of the detector. When higher spatial resolutions would be necessary, for example as in elderly residences or hospitals multiple sensors could be used for triangulation.

In a further aspect of the invention, comparisons with a pre-determined set of "Still Position Allowed Areas" previously stored in a data base of a control system could be carried out. Any still position exceeding a determined amount of time in an unpermitted area could alert a floor/building supervisor who could give a call to the elderly person's room. If no response is received, immediate assistance could be provided.

Figure 2:
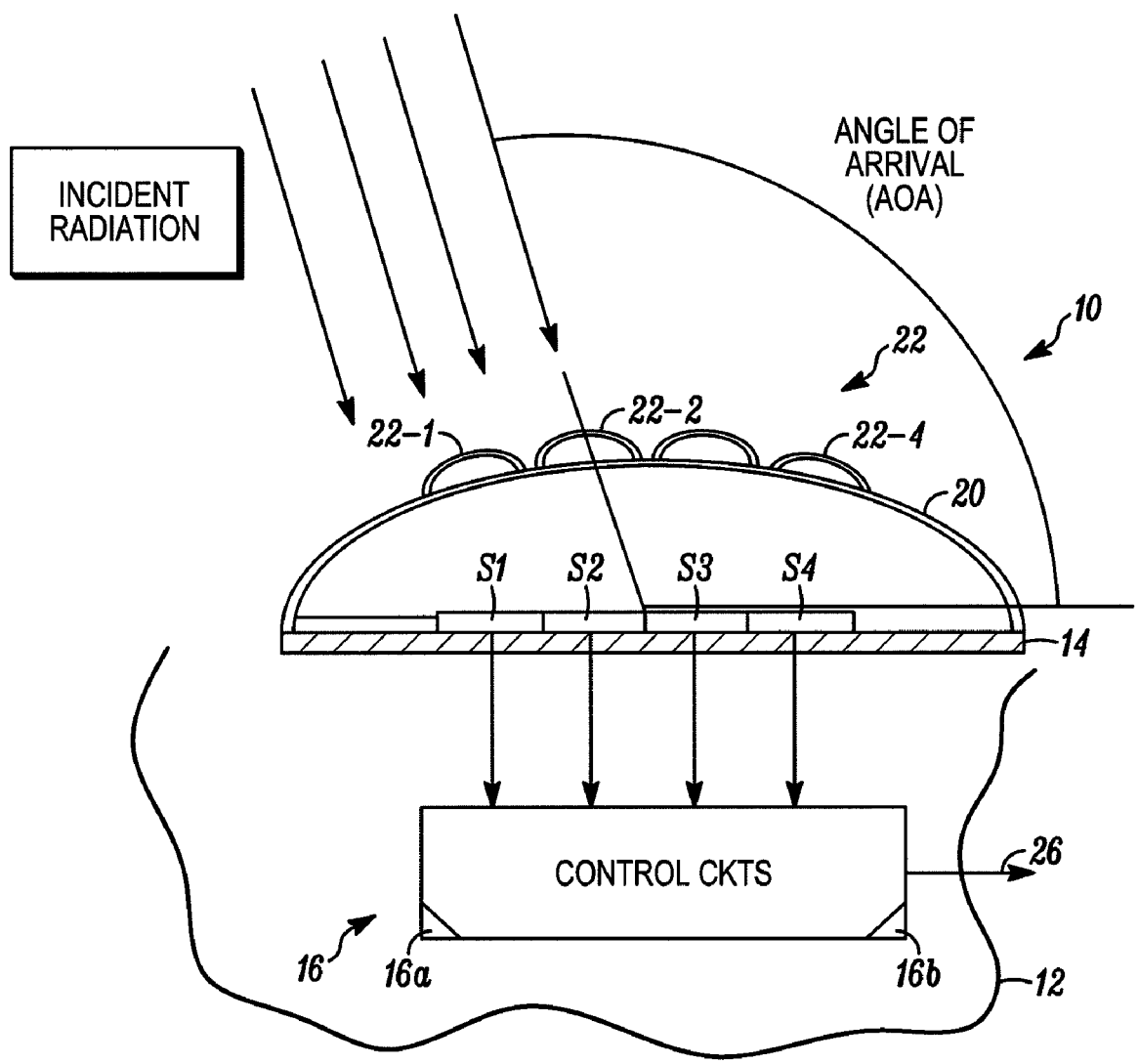
FIG. 2 is a diagram on an exemplary detector which embodies the invention.

Alternately, temperature, $CO_2$ and presence detection could be incorporated into HVAC systems. Ventilation and temperature control would in such embodiments be provided only in occupied rooms thus providing a highly energy efficient HVAC building management system FIG. 2 illustrates a detector 10 in accordance with the invention. Detector 10 is carried in a housing 12 and includes a substrate 14 upon which is formed four thermocouples S1, 2, 3, 4. Signals from the thermocouples S1-4 can be coupled to control circuits 16.

The circuits 16 could be implemented, at least in part with a programmed processor 16a and associated, executable control software or instructions 16b. The instructions 16b could be stored in a computer readable medium such as EEPROM. Other types of storage such as read/write memory or magnetic or optical disks and associated drives come within the spirit and scope of the invention.

Figure 3:
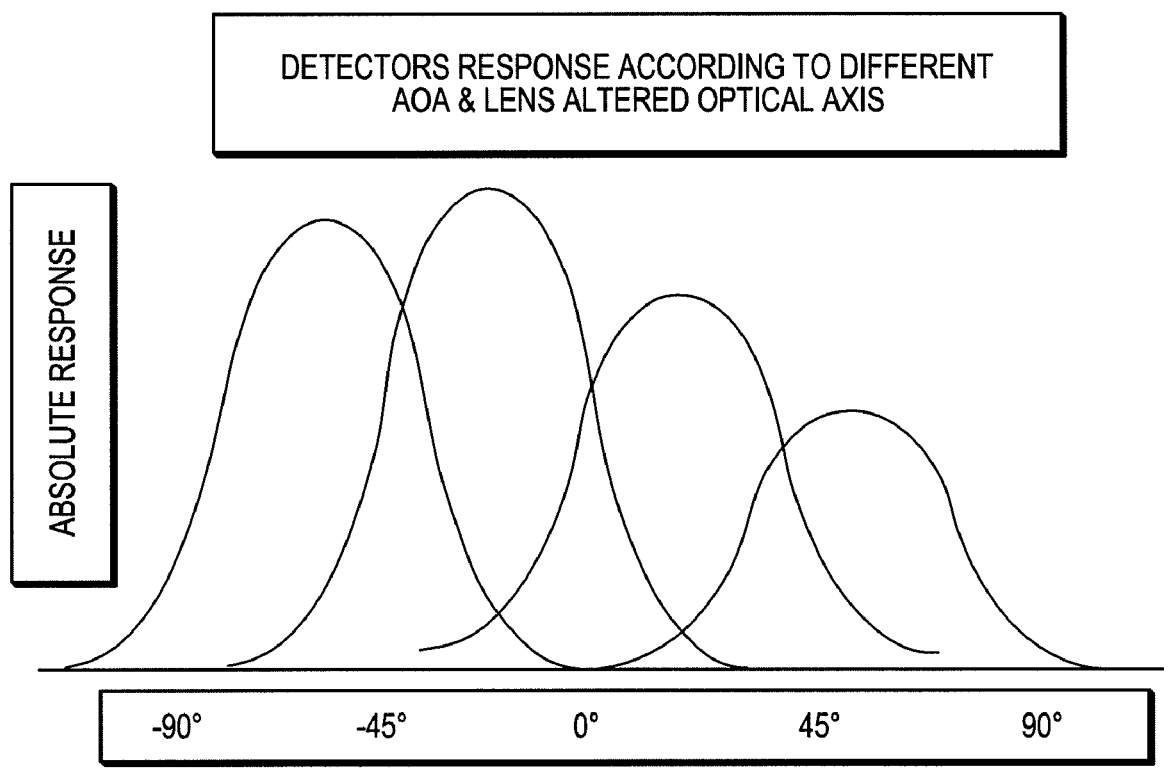
FIG. 3 is a graph illustrating response of sensors of the detector of FIG. 2 as a function of angle of arrival of incident radiation.

Sensors S1-4 could be enclosed by a cover 20. Cover 20 can carry a plurality of lenses 22-1, -2, -3 and -4. The lenses 22 can partition the space into different regions and thereby alter the outputs of the respective sensors S1-4. Sensor response will differ in response to differing angles of arrival as illustrated in FIG. 3. The control circuits 16 can, in response to processing outputs from sensors S1-4 generate a presence indicating output signal 26.

Those of skill will understand that the sensors S1-4 are exemplary only. More or less could be used without departing from the spirit and scope of the invention. In addition, the details of connection to control circuits 16 are not limitations of the invention. Such sensors are especially advantageous in that sensing is not based on movement. Sensors in accordance with the invention respond to human emitted radiant energy in the absence of motion.

Figure 4:
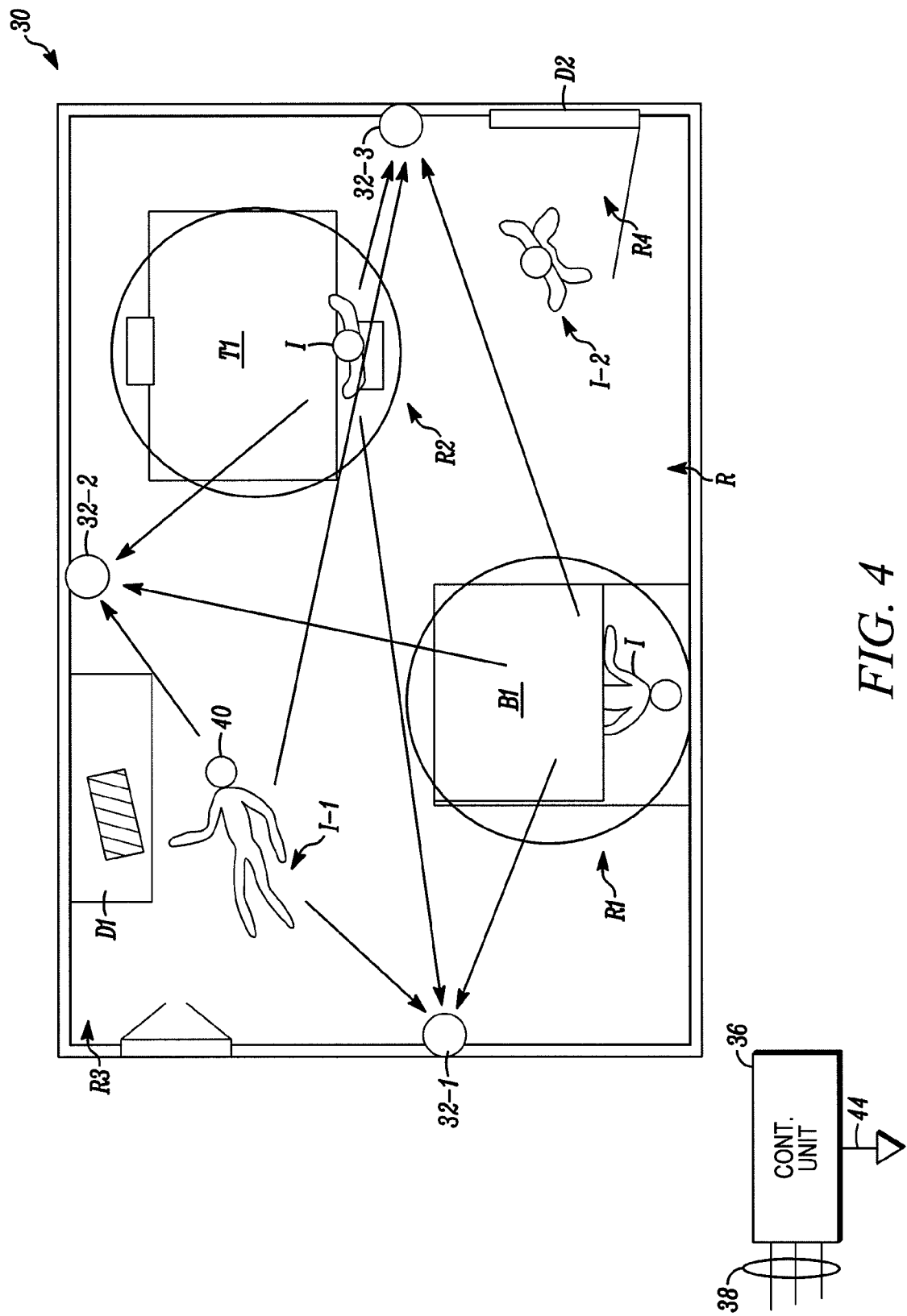
FIG. 4 is a plan view illustrating regional detection with a plurality of detectors as in FIG. 2.

FIG. 4 illustrates a triangulation-type system 30 installed to monitor a region R. Region R includes a plurality of sub-regions, R1, R2 which represent location where an individual I might spend substantial time intervals without raising a concern as to that person's condition. For example, R1 includes a bed B1 and R2 includes a table T1 that might be used by the individual I for substantial periods of time.

As illustrated in FIG. 4 region R includes sub-region R3, which includes desk D1, and R4 adjacent to door D2 where the individual I might be expected to spend less time, perhaps merely passing through.

A plurality of detectors, such as detector 10, 32-1, -2, -3 can be installed through out region R to carry out triangulation-type detection of the location of the individual I in region R. The detectors 32 can be coupled to control unit 36 via wired or wireless media 38. Such detectors respond to human emitted radiant energy in the absence of motion.

Control unit 36 can process signals from the sensors 32 to determine if the individual I is in a region such as R1, 2 where he, she might be expected to spend significant amounts of time. Alternately, the individual, indicated at 1-1, or 1-2 might be in sub-regions, such as R3 or R4 where they might be expected to spend more limited amounts of time, assuming no problems with their condition, or state.

Control unit 36, responding to outputs from sensors 32, for example, in combination with an orientation sensor indicated at 40 and coupled thereto via medium 38 might determine that the individual I-1 is exhibiting a location, and orientation for an inordinately long time which might indicate the presence of a dangerous condition. In response thereto, unit 36 could issue an alarm indicating signal 44 to one or more displaced locations, or persons so that the wellness of individual I-1 can be confirmed.

Where individual I-2 has passed out of door D2, sensors 32 and 40, in combination with control unit 36, would not produce an alarm indicating output.

Those of skill will understand that unit 36 could be coupled to, or part of an ambient condition monitoring system, such as a fire alarm system all without limitation. Alternately, unit 36 could be coupled to an HVAC system or an intrusion monitoring system also without limitation. Unit 36 could also include a physiological condition monitor which could be coupled to one or more physiological sensors carried by the individual I during normal life activities.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A radiant energy detector comprising:
    a support member;
    a plurality of series connected infrared radiation sensors carried by the support member, the sensors each defined by a thermopile having a heat sink side thermally coupled to the support member and a membrane side, the sensors respond to infrared radiation having a wavelength in a 5-to 14-μm wavelength band;
    a plurality of lenses, the lenses direct incident infrared radiation onto respective membrane sides of the sensors, and the lenses alter an intrinsic spatial sensitivity of the respective sensors; and
    an additional wide angle radiant energy detector sensitive in a range of 0.8-1.2 um to discriminate between flaming fire and human emitted radiant energy wherein the plurality of series connected infrared radiation sensors continuously track human presence across a field of view including in the absence of motion based upon the infrared radiation directed by the lenses onto the membrane sides of the sensors, and wherein an angle of arrival of the incident infrared radiation is determined by a response of each of the sensors to the same incident infrared radiation.

2. A detector as in claim 1 where the lenses are carried on a cover of the support member.

3. A detector as in claim 2 which includes control circuits coupled to the sensors, the control circuits, responsive to a plurality of sensor outputs, determine the presence of an individual within a predetermined region adjacent thereto.

4. A detector as in claim 3 where the control circuits include pre-stored software that processes and evaluates the sensor outputs and determines the presence of the individual.

5. A system comprising a plurality of interconnected radiant energy detectors with each member of the plurality including:
    a support member;
    a plurality of series connected infrared radiation sensors carried by the support member, the sensors each defined by a thermopile having a heat sink side thermally coupled to the support member and a membrane side, the sensors respond to infrared radiation having a wavelength in a 5-to 14-μm wavelength band; and
    a plurality of lenses, the lenses direct incident infrared radiation onto respective membrane sides of the sensors, and the lenses alter an intrinsic spatial sensitivity of the respective sensors; and
    an additional wide angle radiant energy detector to discriminate between flaming fire and human emitted radiant energy wherein the plurality of series connected infrared radiation sensors continuously track human presence across a field of view including in the absence of motion based upon the infrared radiation directed by the lenses onto the membrane sides of the sensors, and wherein an angle of arrival of the incident infrared radiation is determined by a response of each of the sensors to the same incident infrared radiation.

6. An apparatus comprising:
    a plurality of radiant energy detectors, the detectors each including a support member;
    a plurality of series connected infrared radiation sensors carried by the support member, the plurality of series connected infrared radiation sensors each defined by a thermopile and each having a heat sink side thermally coupled to the support member and a membrane side, the sensors respond to infrared radiation, from a motionless source, having a wavelength in a 5-to 4 μm wavelength band; and
    a plurality of lenses, the lenses direct incident infrared radiation onto respective membrane sides of the sensors, and the lenses alter an intrinsic spatial sensitivity of the respective sensors; and
    an additional wide angle radiant energy detector sensitive in a range of 0.8-1.2 um to discriminate between flaming fire and human emitted radiant energy; and
    control circuits coupled to the detectors, the circuits process signals from at least some of the detectors to establish the presence and location of an individual in a selected region wherein the plurality of series connected infrared radiation sensors and control circuits continuously track human presence across a field of view including in the absence of motion based upon the infrared radiation directed onto the membrane sides of the sensors, and therein the control circuitry determine an angle of arrival of the incident infrared radiation from a response of each of the sensors to the same incident infrared radiation.

7. An apparatus as in claim 6 where the control circuits compare the established location to a predetermined profile.

8. An apparatus as in claim 7 where the predetermined profile is indicative of one of, that the individual is in an acceptable location, or, that the individual is in a problematic location.

9. An apparatus as in claim 6 which comprises at least one system from a class which includes an intrusion detecting system, a fire detecting system, a lighting control system, an elderly/limited mobility people assistance system or, an HVAC system.

10. An apparatus as in claim 9 where the control circuits are coupled to the at least one system.

11. An apparatus as in claim 10 where the detectors provide inputs to the intrusion detecting system, the inputs are indicative of the presence of one or more individuals in a predetermined region being monitored.

* * * * *